United States Patent
Thakore (10) Patent No.: US 9,606,713 B1
(45) Date of Patent: Mar. 28, 2017

(54) UTILIZING DYNAMIC GRANULARITY FOR APPLICATION CONTROLS

(71) Applicant: Amazon Technologies, Inc., Reno, NV (US)

(72) Inventor: Mayank Thakore, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 204 days.

(21) Appl. No.: 14/106,653

(22) Filed: Dec. 13, 2013

(51) Int. Cl.
*G06F 3/048* (2013.01)
*G06F 3/0485* (2013.01)
*G06F 3/0488* (2013.01)

(52) U.S. Cl.
CPC ........ *G06F 3/04855* (2013.01); *G06F 3/0488* (2013.01)

(58) Field of Classification Search
CPC .. G06F 3/04883; G06F 17/289; G06F 3/0484; G06F 3/017
See application file for complete search history.

(56) References Cited

U.S. PATENT DOCUMENTS

| | | | | |
|---|---|---|---|---|
| 2002/0075572 A1* | 6/2002 | Boreczky | ........... | H04N 7/17336 359/722 |
| 2004/0189691 A1* | 9/2004 | Jojic | ................. | G06F 17/30825 715/720 |
| 2010/0142725 A1* | 6/2010 | Goldstein | ............... | G10L 19/00 381/92 |
| 2010/0153520 A1* | 6/2010 | Daun | ................... | G11B 27/034 709/218 |
| 2011/0157046 A1* | 6/2011 | Lee | ......................... | G04G 21/08 345/173 |
| 2011/0205062 A1* | 8/2011 | Pesot | .................. | A61B 5/0006 340/573.1 |
| 2013/0191747 A1* | 7/2013 | Choi | ...................... | G06F 3/048 715/716 |
| 2013/0218067 A1* | 8/2013 | Saito | ...................... | A61N 1/303 604/20 |
| 2013/0322848 A1* | 12/2013 | Li | .......................... | H04N 5/783 386/241 |

\* cited by examiner

*Primary Examiner* — William Bashore
*Assistant Examiner* — Rayeez Chowdhury
(74) *Attorney, Agent, or Firm* — Kilpatrick Townsend & Stockton LLP (57) ABSTRACT

A user may interact with a control interface in the course of interacting with electronic content. The control interface may include any user interface utilized to adjust various aspects of an application, including, but not limited to, scroll bars, sliders, and/or navigation windows. Input at the control interface may be received from the user indicating that the user desires to manipulate the electronic content (e.g., jump to another location in a movie) or, alternatively, that the user wishes to manipulate the control interface. Upon determining that the input is intended to manipulate the control interface, the control interface may be adjusted to display a control interface view that provides finer or coarser granularity, allowing the user to interact with the control interface with more accuracy.

21 Claims, 10 Drawing Sheets

UTILIZING DYNAMIC GRANULARITY FOR APPLICATION CONTROLS

BACKGROUND

Tablet computers and other touch-screen capable devices have become exceedingly popular with users. However, navigating by touch may be difficult for the user given the limitations of these devices (e.g., screen size, sensitivity, etc.). One especially frustrating aspect of navigating by touch involves utilizing control interfaces. For instance, many users choose to watch videos (e.g., movies) on their touch screen device. In one example, the user may wish to navigate to another location in the movie. To accomplish this, he may select a user interface element on a navigational scroll bar and drag it to the position corresponding to the location where he wishes to continue viewing.

Conventional controls make it difficult for the user to make the exact selection he desires because the control may only allow him to make selections in predetermined increments. For instance, the user may wish to replay the last five seconds of a movie but the control only allows navigation by fifteen second increments. This limitation may lead to undesirable results. For instance, the user may have to repeatedly use the user interface element in order to navigate to the desired position, possibly never getting the exact selection desired. Thus, current techniques for navigating control interfaces are cumbersome, inefficient, and may lead to user frustration and a diminished user experience.

BRIEF DESCRIPTION OF THE DRAWINGS

Various embodiments in accordance with the present disclosure will be described with reference to the drawings, in which.

DETAILED DESCRIPTION

In the following description, various embodiments of the present disclosure will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Some or all of the process described may be performed under the control of one or more computer systems configured with specific computer-executable instructions and may be implemented as code (e.g., executable instructions, one or more computer programs or one or more applications) executing collectively on one or more processors, by hardware or combinations thereof. The code may be stored on a non-transitory computer-readable storage medium, for example, in the form of a computer program including a plurality of instructions executable by one or more processors. The computer-readable storage medium may be non-transitory.

A "control," as used herein, is intended to refer to any user interface utilized to adjust various aspects of an application or of electronic content, including, but not limited to, scroll bars, sliders, navigation windows, etc. A "control interface view," as used herein, is intended to refer to a zoomed-in view of a control interface where a subset of the original control range is viewable in the control interface. Additionally, a "touch input," as used herein, is intended to refer to any physical contact made with an electronic device. An "adjustment interface," as used herein, is an interface capable of changing the granularity of a control interface display. A "navigational interface," as used herein, is intended to refer to an interface capable of moving the focus of a control interface. A navigational interface may be included within an adjustment interface. As used herein, the phrase "zoom in" refers to enlarging the display of an object, the reducing occurring with respect to a focal point As used herein, the term "zoom out" refers to reducing the display of an object, the reducing occurring with respect to a focal point.

Techniques described herein are directed to enabling a user of an electronic device to utilize a dynamic granularity control engine to adjust granularity of control interfaces. For example, a user may be provided electronic content (e.g., a movie) for display on an electronic device of a user (e.g., a tablet personal computer (PC)). In at least one example, the electronic device may be any device capable of receiving input (e.g., touch input). The electronic content may comprise a control interface such as a scrollbar for navigating within the movie. The user may select to enter an adjustment mode of the scrollbar by selecting an adjustment mode (e.g., by checking a box) or by selecting and/or hovering over the thumb (e.g., the navigational control element selectable by the user) of the scrollbar. In response to entering the adjustment mode, the representation of the control may be adjusted to display a portion of the control with finer granularity than before entering the adjustment mode. The adjustment interface may be displayed over the control interface enabling the user to select various actions including enlarging and/or reducing the representation of the control interface. Selecting one of these actions may adjust the granularity the control interface to display another control interface view. For instance, continuing with the current example, the user may select a particular location of the adjustment interface to display a portion of the control with finer or coarser granularity.

In one non-limiting example, a user may be watching a movie within a media application. The movie may be an hour and twenty minutes in duration. The user, ten minutes into the movie, may decide she enjoyed a particular interaction between the actors. As a result, she may decide to replay the interaction. As an example, consider that she wants to begin reviewing the movie at a point that is two minutes and thirteen seconds prior to where she is currently viewing. However, the user may not know exactly where to begin replaying. She may select the control interface and begin dragging in search of the beginning of the portion she wants to watch again. As she slides the control, she may find that sliding to the left starts replay too early in the movie, while sliding to the right starts replay too late. Within the media application, or utilizing any suitable adjustment mode selector, the user may indicate that she desires to enter adjustment mode. In this example, the user may select the thumb of the control and hold, or hover, for a period of time. This may result in the interface entering adjustment mode causing the dynamic granularity control engine to provide a graphical user interface enabling the user to access an adjustment interface for the control. Once in adjustment mode the user may "zoom-in" to an area of the control generally located around the desired playback location. Upon zoom-in, the representation of the control interface may be adjusted to display another control interface view where the range of the control interface has decreased. For instance, the zoom-in may cause the control interface range to change from a range of 0-120 minutes, to a range of 0-30 minutes. As a result, the user may be presented with the ability to slide the thumb in smaller increments enabling her to make a more accurate selection with the control than she was previously able to accomplish before adjusting the control interface granularity.

Any control utilizing incremental selection may benefit from the dynamic granularity control engine. Though a scroll bar is given as an example, a slider or navigational control may be used. As another non-limiting example, a user may adjust the granularity of a volume control. Fully displayed in an original control interface view, perhaps the volume may only be adjusted in increments of five. Thus, if the volume is at seventy percent, the user may only adjust the control to sixty-five or seventy-five percent. However, were the user to select the adjustment mode selector, she may be enabled to adjust the volume control in increments of two. Thus, if the volume is at seventy percent, the user may now adjust the control to sixty-eight or seventy-two percent.

Additionally, the user may further be enabled, by the provided user interface, to scroll through different views of the control. For example, perhaps at first, a control displays a range of zero to one hundred, with control selections allowed in increments of five. The user may indicate he wishes to enter adjustment mode, select a location of the control, and use the provided adjustment interface to the change the representation of the control interface view at the selected location. Perhaps the user selected the location of thirty on the old control. Once adjusted, the control may display a shorter range than previously displayed. In this case, instead of displaying zero to one hundred with allowable selections in increments of five, the control may display zero to sixty with allowable selections in increments of three. Thus, the total area used to display the control is consistent, but the granularity of the control may change according to user input.

In one non-limiting example, a user may configure an adjustment interface for a control. The user may define areas that may serve to adjust the representation of the control. Additionally, a navigational interface may be provided such that selection of the navigational interface may change the control interface view while maintaining the granularity of the control interface view. Further, the adjustment interface is user-configurable and customizable.

Figure 1:
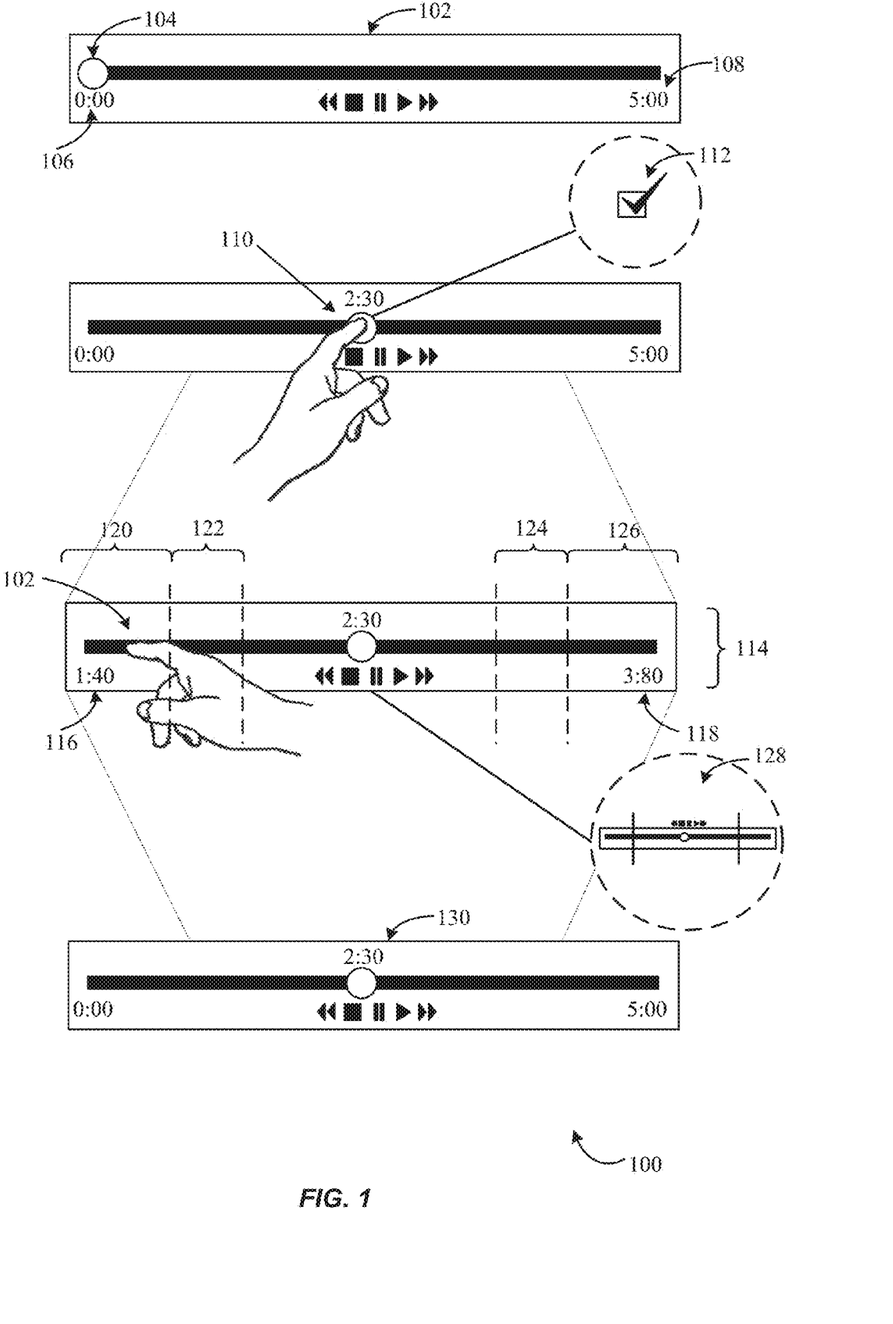
FIG. 1 illustrates an example user interface provided by a dynamic granularity control engine, in accordance with at least one embodiment.

Referring now to the drawings, in which like reference numerals represent like parts, FIG. 1 illustrates an example user interface 100 provided by a dynamic granularity control engine, in accordance with at least one embodiment. As will be appreciated by one of skill in the art, any suitable electronic device capable of receiving user input may be utilized to interact with the dynamic granularity control engine. In accordance with at least one embodiment, a user of an electronic device (e.g., a tablet PC) may navigate to an application he wishes to use (e.g., a music player application) through touch input. Though examples may be given using touch input, it should be appreciated by one skilled in the art that a mouse or other suitable user input device may be utilized. For example, while interacting with an application, the user may wish to interact with a control similar to control 102. Control 102 comprises a navigational scroll bar used to navigate through the contents of an audio file. Though a navigational scroll bar is depicted in this example, any suitable control used to navigate content, interact with an application, or interact with an operating system may be used.

In accordance with at least one embodiment, the user may select content to be played (e.g., a song). At first, the control may display a thumb 104, located on the far left of control 102 indicating play occurring starting at the beginning of the song. In at least one example, the beginning time 106 and end time 108 may be displayed in control 102. Beginning time 106 and end time 108 may be indicative of a total run time of the song; for instance, this song may be five minutes in length. At some point, the user may wish to jump to another location in the song. To do so, the user may use his finger to touch thumb 104 and drag the thumb to location 110. In at least one example, the user may be attempting to navigate to a particular portion of the song. However, it may become apparent to the user that he is unable to drag thumb 104 accurately to the location desired. In at least one example, the user may wish to modify the granularity of the control in order to navigate within smaller increments of the content.

In accordance with at least one embodiment, the user may select an adjustment mode indicator 112, in this case, a check box, to indicate that the user wishes to enter adjustment mode. Alternatively, the user may select and hold thumb 104 for a configurable amount of time. On elapse of a threshold amount of time (e.g., the configurable amount of time), the dynamic granularity control engine may be notified that the user has entered adjustment mode. Additionally, upon activating adjustment mode, display of control 102 may be adjusted such that beginning time 116 and end time 118 may be displayed, though the overall area utilized by control 102 remains unchanged.

In accordance with at least one embodiment, once adjustment mode is active, the dynamic granularity control engine may provide to the user an adjustment interface 114. In at least one example, an adjustment interface 114 may utilize an area previously used to display control 102. For instance, the adjustment interface 114 may be overlaid over control 102 and indicated by color, shading, or any suitable graphical representation of a selectable area. In at least one example, the adjustment interface 114 may be transparent in nature. In either example, the adjustment interface 114 may comprise multiple areas defined to execute various actions. For instance, an adjustment interface 114 may comprise multiple areas including, but not limited to, a zoom-out area 120, a scroll-left area 122, a scroll-right area 124, and a zoom-in area 126. The scroll-left area 122 and the scroll-right area 124 may comprise a navigational interface included as part of the adjustment interface.

In accordance with at least one embodiment, a user may select a point with zoom-in area 126 to gain further granularity of control 102. Similarly, a user may select a point within zoom-out area 120 to reduce granularity of control 102. Scroll-left area 122 and scroll-right area 124 may be used to scroll the focus of control to the left or right direction, respectively. For instance, the user may currently be displayed time 1:40 to 3:80. Were the user to select a point within scroll-left area 122, the control times displayed may be adjusted to a beginning time of 1:00 to 3:00, while the control granularity remains unchanged. Similarly, the user may then select a point within scroll-right area 124, the control times displayed may be adjusted to a beginning time of 1:40 and an end time of 3:80, once again, leaving the control granularity unchanged. The movement of the control as a result of a selection by the user of scroll-left area 122 or scroll-right area 124 may emulate a panning animation such that the scroll bar appears to be moving within a consistent area of control 102. Alternatively, a scroll action (e.g., selection of scroll-left area 122 or scroll-right area 124) may not appear to "move" the focus of control 102; rather, the scroll action may update control 102 with a new beginning and end times. In at least one example, selection of scroll-left area 122 or scroll right area 124 may reduce or miniaturize display of control 102 to display a miniaturized display 128 such that the full range of the control 102 may be shown while a highlighted area is displayed over the miniaturized display 128 indicative of the focus of the zoom user interface 114.

In accordance with at least one embodiment, a user may select a point in zoom-out area 120 to return control 102 to its original granularity as depicted by diagram 128. To exit adjustment mode, the user may un-check adjustment mode indicator 112. Alternatively, the user may double-click/double-tap control 102 to exit adjustment mode.

In this manner, a user may adjust the granularity of control 102 enabling a user to navigate control 102 with greater accuracy.

Figure 2:
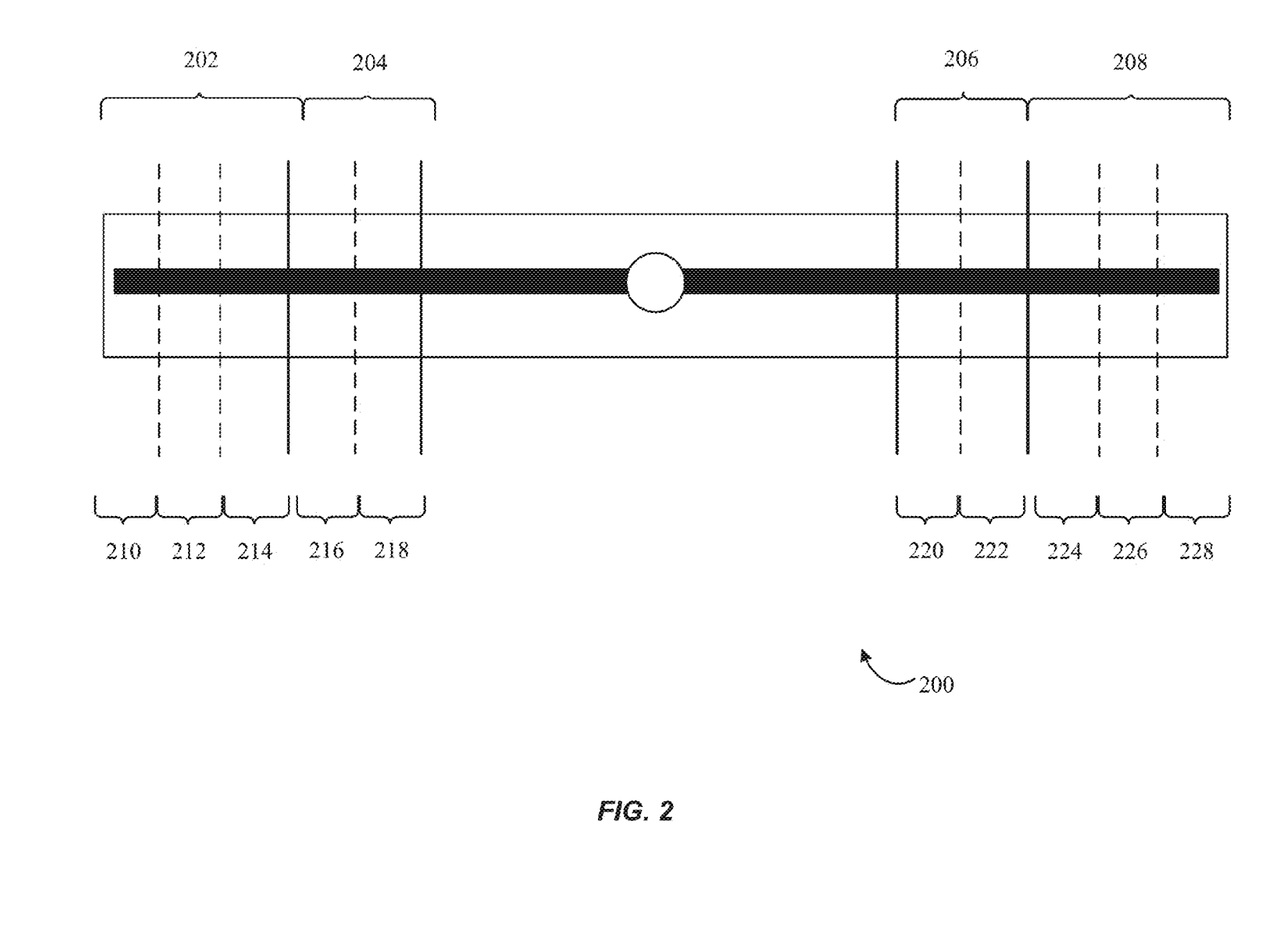
FIG. 2 is a schematic diagram depicting aspects of an example user interface provided by the dynamic granularity control engine, in accordance with at least one embodiment.

FIG. 2 is a schematic diagram depicting aspects of an example user interface provided by the dynamic granularity control engine, in accordance with at least one embodiment. In accordance with at least one embodiment, adjustment interface 200 consists of multiple adjustment areas. As described above in connection with FIG. 1, adjustment interface 200 may comprise multiple areas including, but not limited to, a zoom-out area 202, a scroll-left area 204, a scroll-right area 206, and a zoom-in area 208. A navigational portion of the adjustment interface may comprise the scroll-left area 204 and scroll-right area 206. Areas 202-208 may be utilized in a similar manner as described in connection with FIG. 1. It should be understood by one skill in the art, that areas 202-228 are user-configurable and may be utilized in a similar manner as described in FIG. 2 or in a different configuration as specified by the user.

In accordance with at least one embodiment, zoom-out area 202 may comprise multiple sub-areas including, but not limited to, a fast speed zoom-out area 210, a medium speed zoom-out area 212, and a slow zoom-out area 214. Selection of medium speed zoom-out area 212 may zoom out at a faster speed that a zoom executed by selection of slow zoom-out area 214. Similarly, fast zoom-out area 210 may zoom-out at a faster speed than a zoom executed by selection of medium zoom-out area 212. Utilizing these sub-areas, the user may have greater accuracy in controlling a rate at which zoom-out occurs.

In accordance with at least one embodiment, scroll-left area 204 may comprise multiple sub-areas including, but not limited to, a fast scroll-left area 216 and a slow scroll-left area 218. Selection of fast scroll-left area 216 may scroll the focus of control 200 left at a faster rate than a scroll executed by selection of slow scroll-left area 218. Utilizing these sub-areas, the user may have greater accuracy in controlling a rate at which scrolling left within control 200 occurs.

In accordance with at least one embodiment, scroll-right area 206 may comprise multiple sub-areas including, but not limited to, a slow scroll-right area 220 and a fast scroll-right area 222. Selection of fast scroll-right area 222 may scroll the focus of adjustment interface 200 to the right at a faster rate than slow scroll-right area 220. Utilizing these sub-areas, the user may have may have greater accuracy in controlling a rate at which scrolling right within adjustment interface 200 occurs.

In accordance with at least one embodiment, zoom-in area 208 may comprise multiple sub-areas including, but not limited to, a slow speed zoom-in area 224, a medium speed zoom-in area 226, and a slow zoom-in area 228. Selection of medium speed zoom-in area 226 may zoom in at a faster speed than a zoom executed by selection of slow zoom-in area 226. Similarly, fast zoom-in area 228 may zoom in at a faster speed than a zoom executed by selection of medium zoom-in area 226. Utilizing these sub-areas, the user may have greater accuracy in controlling a rate at which zoom-in occurs.

Figure 3:
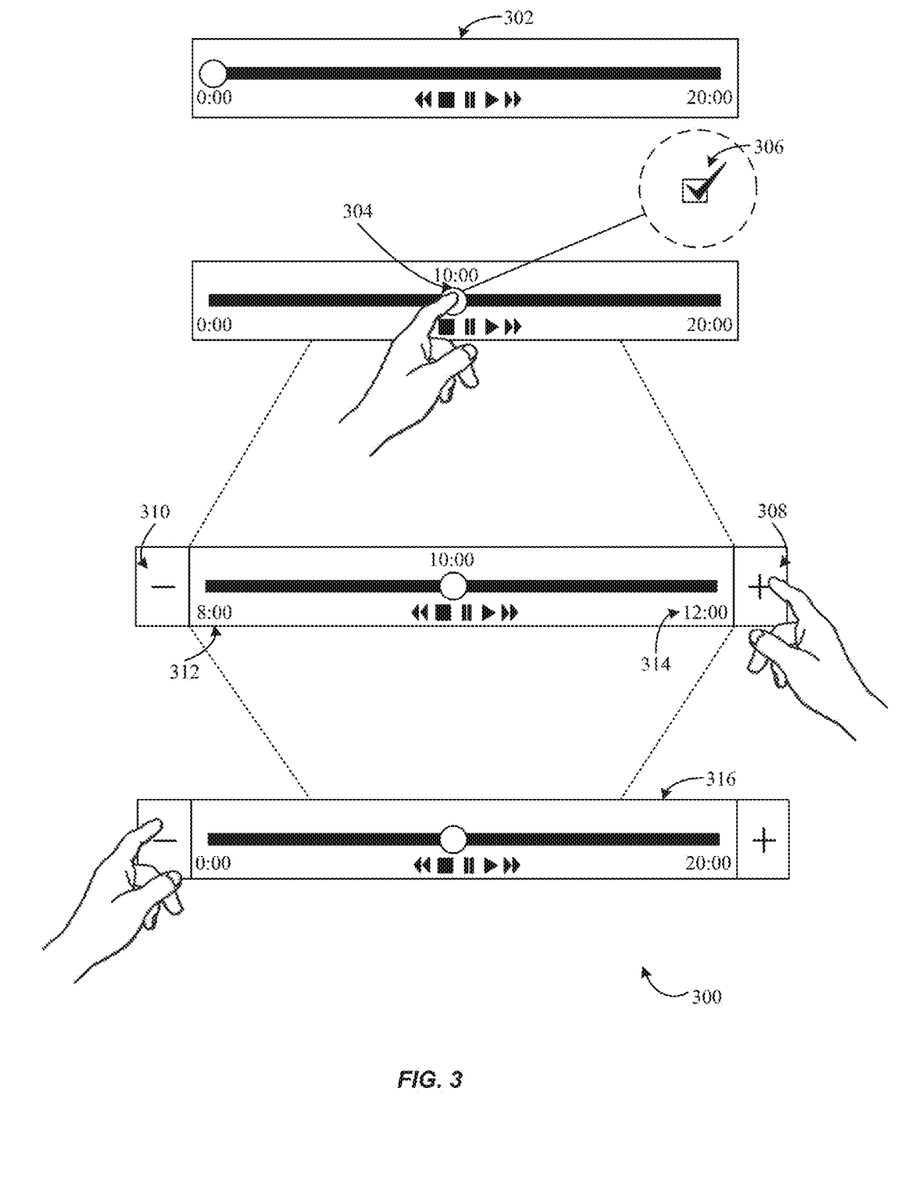
FIG. 3 illustrates another example user interface provided by the dynamic granularity control engine, in accordance with at least one embodiment.

FIG. 3 illustrates another example adjustment interface 300 for a dynamic granularity control engine, in accordance with at least one embodiment. In a similar context as described with respect to FIG. 1, control 302 comprises a navigational scroll bar used to navigate through the contents of a file (e.g., an audio file). The user may select and drag thumb 304 to location 306 within control 302. The user may enter adjustment mode in a similar manner as described above (e.g., by selecting adjustment mode indicator 306 or double clicking/double tapping). Upon entering adjustment mode, the dynamic granularity control engine may provide adjustment interface 300 including a zoom-in area 308 and zoom-out area 310. Upon selection, by the user, of zoom-in area 308, the granularity of control 302 may be increased such that beginning time indicator 312 and end time indicator 314 become consecutively closer together if zoom-in area 308 is repeatedly selected. Similarly, upon selection, by the user, of zoom-out area 310, the granularity of control 302 may be decreased such that beginning time indicator 312 and end time indicator 314 become consecutively farther apart if zoom-out area 310 is repeatedly selected as depicted by diagram 316.

Figure 4:
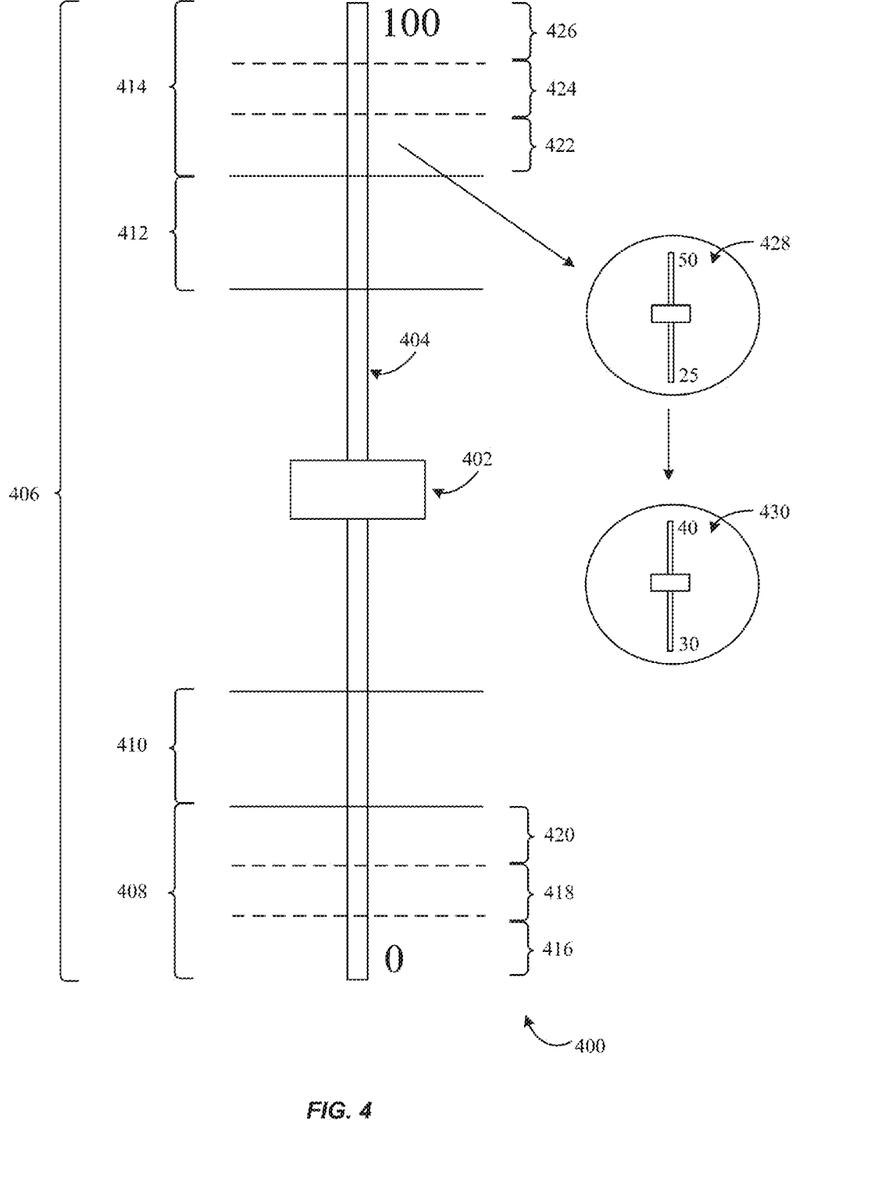
FIG. 4 illustrates another example user interface provided by the dynamic granularity control engine, in accordance with at least one further embodiment.

FIG. 4 illustrates another example user interface provided by the dynamic granularity control engine, in accordance with at least one further embodiment. In accordance with at least one embodiment, a user of an electronic device (e.g., a smart phone) may navigate to an application he wishes to use (e.g., a music player application) through touch. Control 400 comprises a slider bar used to adjust volume setting. Though a slider bar is depicted in this example, any suitable control used to navigate content, interact with an application, or interact with an operating system may be used. To adjust volume for the application, a user may select, hold, and drag thumb 402 up along slider bar 404 to increase volume. Similarly, the user may select, hold, and drag thumb 402 down along slider bar 404 to decrease volume.

In accordance with at least one embodiment, control 400 may initially display a range of 0 to 100, allowing the thumb to select volume settings in increments of 10. However, the user may desire to adjust the volume to 34. To do so, the user may need to zoom in to control 400.

In accordance with at least one embodiment, a user enters adjustment mode in a manner similar to that described in FIG. 1. Once adjustment mode is activated, the dynamic granularity control engine may provide to the user an adjustment interface 406. In at least one example, the adjustment interface 406 may utilize an area previously used to display control 400. For instance, the adjustment interface 406 may be overlaid over control 400 and indicated by color, shading, or any suitable graphical representation of a selectable area. In at least one example, the adjustment interface 406 may be transparent in nature.

In accordance with at least one embodiment, adjustment interface 406 may comprise multiple areas defined to execute various actions. For instance, adjustment interface 406 may comprise multiple areas including, but not limited to, a zoom-out area 408, a scroll-up area 410, a scroll-down area 412, and a zoom-out area 414. The zoom-out area 408 may further comprise of multiple sub-areas. For instance, zoom-out area 408 may include fast zoom-out area 416, medium zoom-out area 414, and slow zoom-out area 420. Zoom-in area 414 may further comprise multiple sub-areas, namely slow zoom-in area 422, medium zoom-in area 424, and fast zoom-in area 426. Sub-areas 416-426 may be used to control the speed at which adjustments to the control interface occur, in a similar manner as described with respect to FIG. 2.

In accordance with at least one embodiment, a user may select a point with in zoom-in area 414. Upon selection control view 428 may be displayed to the user, replacing the previous control view displaying a range of 0 to 100 with adjustments in increments of 10 available, with control interface view 428 displaying a range of 25 to 50 with adjustment in increments of 5. A further selection of zoom-in area 414 may display control view 430. Control interface view 430 may replace control interface view 428. It may be appreciated that control interface view 430 displays a range of 30 to 40 with increments of 2. The degree to which the control interface view adjusts in or adjusts out may vary, depending on the initial range available by the control, by a predetermined algorithm, or may be configured by the user. Adjustment actions may be repeatedly executed infinitum, or the number of selections of adjustment actions may be restricted.

Figure 5:
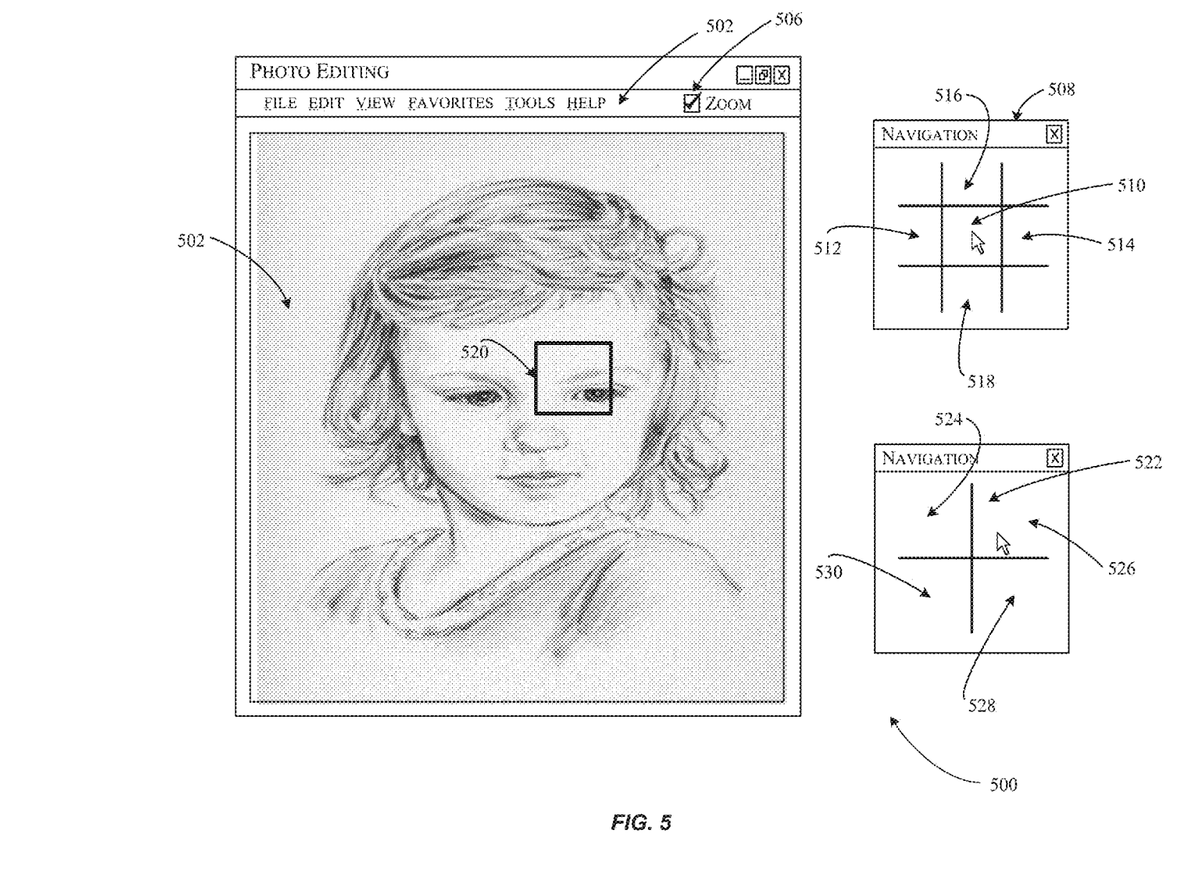
FIG. 5 illustrates another example user interface provided by the dynamic granularity control engine, in accordance with still one further embodiment.

FIG. 5 illustrates another example user interface provided by the dynamic granularity control engine, in accordance with still one further embodiment. Application window 502 may be a display window of a photo editing application. A user may load an image using a traditional method associated with the photo editing application. A user, in a similar manner as described in FIG. 1, may double-click/double tap a navigation control 504, select an adjustment mode indicator 506 (e.g., adjustment mode indicator 112), or select a navigation control 508 from a menu provided by the application. Upon entering the adjustment mode, adjustment interface 510 may be displayed. Adjustment interface 510 may comprise a user interface similar to a two-dimensional representation of adjustment interface 200 of FIG. 2. Adjustment interface 510 may include a zoom-out area 512, zoom-in area 514, zoom speed increase area 516, zoom speed reduce area 518.

In accordance with at least one embodiment, upon entering adjustment mode, zoom window 520 may displayed over the content, in this case, a portrait of a child. For zoom purposes, zoom window 520 may act as the focus of a zoom. Upon selection, by the user, of a point falling within zoom-out area 512, the picture may be zoomed out. As the picture was zooming, the user may select a point within zoom speed increase area 516 to increase the speed at which the zoom-in may be occurring. Similarly, the user may select a point within zoom speed decrease area 518 to decrease the speed at which the zoom-in may be occurring. To halt the zoom, the user may reselect zoom-out area 512.

In accordance with at least one embodiment, upon selection, by the user, of a point falling within zoom-in area 514, the picture would zoom in. As the picture was adjusting, the user may select a point within zoom speed increase area 516 to increase the speed at which the zoom-in may be occurring. Similarly, the user may select a point within zoom speed decrease area 518 to decrease the speed at which the zoom-in may be occurring. To halt the zoom, the user may reselect zoom-in area 514.

In accordance with at least one embodiment, a user may configure adjustment interface 522. For instance, the user may define a zoom-out area 524, a zoom-in area 526, a zoom speed increase area 528, and a zoom speed reduce area 530. Upon selection, by the user, of a point falling within zoom-out area 524, the picture may be zoomed out. As the picture was adjusting, the user may select a point within zoom speed increase area 528 to increase the speed at which the zoom-in may be occurring. Similarly, the user may select a point within zoom speed decrease area 530 to decrease the speed at which the zoom-in may be occurring. To halt the zoom, the user may reselect zoom-out area 524.

In accordance with at least one embodiment, upon selection, by the user, of a point falling within zoom-in area 526, the picture would zoom in. As the picture was adjusting, the user may select a point within zoom speed increase area 528 to increase the speed at which the zoom-in may be occurring. Similarly, the user may select a point within zoom speed decrease area 530 to decrease the speed at which the zoom-in may be occurring. To halt the zoom, the user may reselect zoom-in area 526.

Though examples are given regarding possible configurations of zoom user interface 508 and 522, it should be appreciated that these examples are non-limiting in nature.

Figure 6:
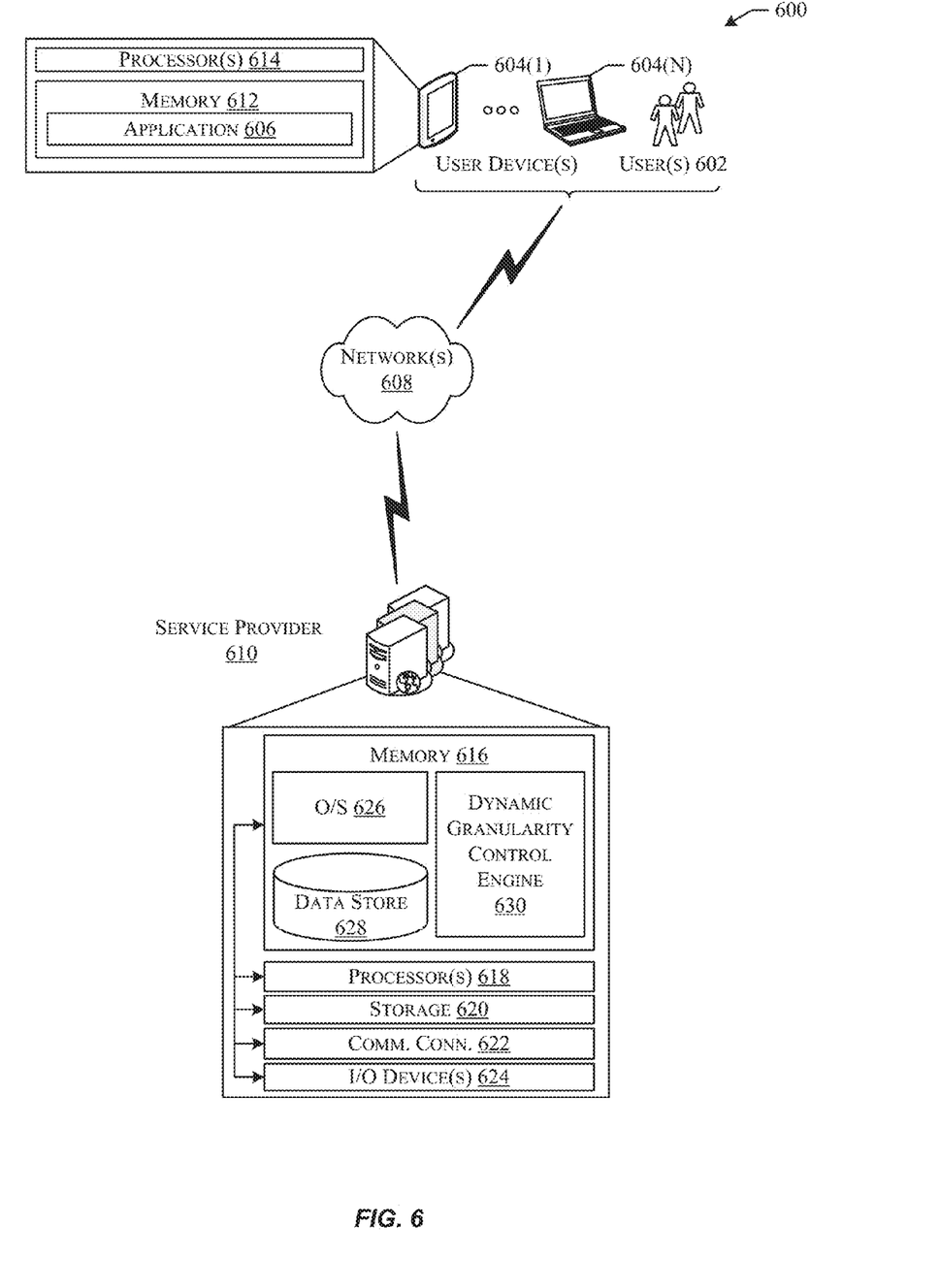
FIG. 6 depicts an illustrative system or architecture for providing the dynamic granularity control engine in accordance with at least one embodiment.

FIG. 6 depicts an illustrative system or architecture 600 for providing a dynamic granularity control engine in accordance with at least one embodiment. In architecture 600, one or more users 602 may utilize user computing devices 604(1)-(N) (collectively, user devices 604) to access an application 606 (e.g., a media player, a photo editor, or any suitable application that includes controls) or a user interface accessible through the application 606 via one or more networks 608. In some aspects, the application 606 may be hosted, managed, and/or provided by a computing resources service or service provider, such as by utilizing one or more service provider computers 610. The one or more service provider computers 610 may, in some examples, provide computing resources such as, but not limited to, client entities, low latency data storage, durable data storage, data access, management, virtualization, cloud-based software solutions, electronic content performance management, etc. The one or more service provider computers 610 may also be operable to provide web hosting, computer application development, and/or implementation platforms, combinations of the foregoing, or the like to the one or more users 602.

In some examples, the networks 608 may include any one or a combination of many different types of networks, such as cable networks, the Internet, wireless networks, cellular networks and other private and/or public networks. While the illustrated example represents the users 602 accessing the application 606 over the networks 608, the described techniques may equally apply in instances where the users 602 interact with the service provider computers 610 via the one or more user devices 604 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 606 may allow the users 602 to interact with the service provider computers 610. The one or more service provider computers 610, perhaps arranged in a cluster of servers or as a server farm, may host the application 606 and/or cloud-based software services. Other server architectures may also be used to host the application 606 and/or cloud-based software services. The application 606 may be capable of handling requests from many users 602 and serving, in response, various user interfaces that can be rendered at the user devices 604 such as, but not limited to perceived latency or the like. The application 606 can provide any type of device or application control. The application 606 and/or corresponding control may be provided by the Operating System of user devices 604. As discussed above, the described techniques can similarly be implemented outside of the application 606, such as with other applications running on the user devices 604.

The user devices 604 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 604 may be in communication with the service provider computers 610 via the networks 608, or via other network connections. Additionally, the user devices 604 may be part of the distributed system managed by, controlled by, or otherwise part of the service provider computers 610.

In one illustrative configuration, the user devices 604 may include at least one memory 612 and one or more processing units (or processor(s)) 614. The processor(s) 614 may be implemented as appropriate in hardware, computer-executable instructions, firmware, or combinations thereof. Computer-executable instruction or firmware implementations of the processor(s) 614 may include computer-executable or machine-executable instructions written in any suitable programming language to perform the various functions described.

The memory 612 may store program instructions that are loadable and executable on the processor(s) 614, as well as data generated during the execution of these programs. Depending on the configuration and type of user device 604, the memory 612 may be volatile (such as random access memory (RAM)) and/or non-volatile (such as read-only memory (ROM), flash memory, etc.). The user device 604 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 612 may include multiple different types of memory, such as static random access memory (SRAM), dynamic random access memory (DRAM), or ROM.

Turning to the contents of the memory 612 in more detail, the memory 612 may include an operating system and one or more application programs, modules, or services for implementing the features disclosed herein including at least the perceived latency, such as via the application 606 or dedicated applications (e.g., smart phone applications, tablet applications, etc.). The application 606 may be configured to receive, store, and/or display content and at least one control (e.g., control 102), or other interface for interacting with the service provider computers 610. Additionally, the memory 612 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

In some aspects, the service provider computers 610 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the service provider computers 610 may be in communication with the user devices 604 and/or other service providers via the networks 608, or via other network connections. The service provider computers 610 may include one or more servers, perhaps arranged in a cluster, as a server farm, or as individual servers not associated with one another. These servers may be configured to implement the content performance management described herein as part of an integrated, distributed computing environment.

In one illustrative configuration, the service provider computers 610 may include at least one memory 61+ and one or more processing units (or processor(s)) 618. The processor(s) 618 may be implemented as appropriate in hardware, computer-executable instructions, firmware, or combinations thereof. Computer-executable instruction or firmware implementations of the processor(s) 618 may include computer-executable or machine-executable instructions written in any suitable programming language to perform the various functions described.

The memory 616 may store program instructions that are loadable and executable on the processor(s) 618, as well as data generated during the execution of these programs. Depending on the configuration and type of service provider computers 610, the memory 616 may be volatile (such as RAM) and/or non-volatile (such as ROM, flash memory, etc.). The service provider computers 610 or servers may also include additional storage 620, which may include removable storage and/or non-removable storage. The additional storage 620 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 616 may include multiple different types of memory, such as SRAM, DRAM, or ROM.

The memory 616, the additional storage 620, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 616 and the additional storage 620 are all examples of computer storage media. Additional types of computer storage media that may be present in the service provider computers 610 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 610. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 610 may also contain communications connection(s) 622 that allow the service provider computers 610 to communicate with a stored database, another computing device or server, user terminals and/or other devices on the networks 608. The service provider computers 610 may also include I/O device(s) 624, such as a keyboard, a mouse, a pen, a voice input device, a touch input device, a display, speakers, a printer, etc.

Turning to the contents of the memory 616 in more detail and will be described in further detail in FIG. 7, the memory 616 may include an operating system 626, one or more data stores 628, and/or one or more application programs, modules, or services for implementing the features disclosed herein including a dynamic granularity control engine 630. Alternatively, dynamic granularity control engine 630 may be stored on memory 612 and run on user device 604 or may exist as a separate application running on user device 604.

Figure 7:
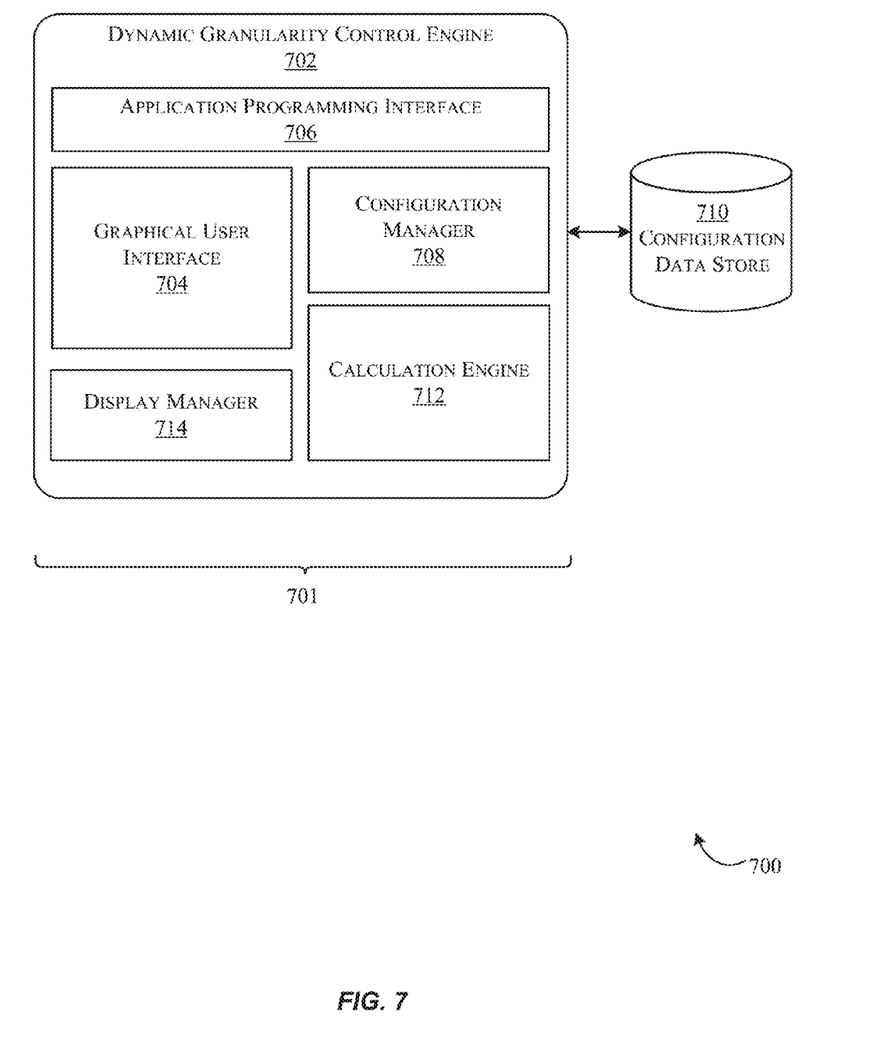
FIG. 7 schematically illustrates an example computer architecture for the dynamic granularity control engine, including a plurality of modules that may carry out various embodiments.

FIG. 7 schematically illustrates an example computer architecture for a dynamic granularity control engine, including a plurality of modules that may carry out various embodiments. The modules 701 may be software modules, hardware modules, or a combination thereof. If the modules 701 are software modules, the modules 701 can be embodied on a computer-readable medium and processed by a processor in any of the computer systems described herein. It should be noted that any module or data store described herein, may be, in some embodiments, a service responsible for managing data of the type required to make corresponding calculations. The modules 701 may be configured in the manner suggested in FIG. 7 or may exist as separate modules or services external to the dynamic granularity control engine 702.

In accordance with at least one embodiment, a method is enabled for providing a zoom interface. For example, the dynamic granularity control engine 702 may be a component of one of the electronic devices discussed above in connection with FIGS. 1 and 2. The dynamic granularity control engine 302 may be stored on an electronic device or be stored on a server accessible to the electronic device. Electronic devices, as indicated above, may be a cell phone, a laptop computer, a desktop computer, a tablet PC, or any suitable device capable of receiving user navigational input. A user may configure the dynamic granularity control engine 702 via a graphical user interface 704, a component of the dynamic granularity control engine 702. The user may enter configuration information including, but not limited to, adjustment restrictions, visual themes associated with adjustment interfaces, speed options associated with the adjustment interfaces. Once configuration information is entered via graphical user interface 704, application programming interface 706, a component of dynamic granularity control engine 702, may be utilized to communicate the configuration information to the dynamic granularity control engine 702.

In accordance with at least one embodiment, configuration manager 708, a component of the dynamic granularity control engine 702, may be configured to receive configuration information. The configuration manager 708 may be responsible for creating and maintaining a user profile utilized to store such configuration information. Further, the configuration manager may cause such configuration data to be stored in a configuration data store 710.

In accordance with at least one embodiment, a user may utilize graphical user interface 704 to make a selection of an adjustment mode. The selection may be communicated utilizing application programming interface 706 to calculation engine 712, a component of dynamic granularity control engine 702. Calculation engine 712 may be responsible for utilizing received user input and calculating control interface view ranges. User input may include adjustment mode activation, adjustment mode deactivation, or an indication of user interaction with adjustment interface (e.g., adjustment interface 100). Calculation engine 712 may communicate these calculations to display manager 714, a component of dynamic granularity control engine 702. Display manager 714 may be responsible for utilizing configuration information and calculations determined by the calculation engine 712 to provide an adjustment interface to the user.

Figure 8:
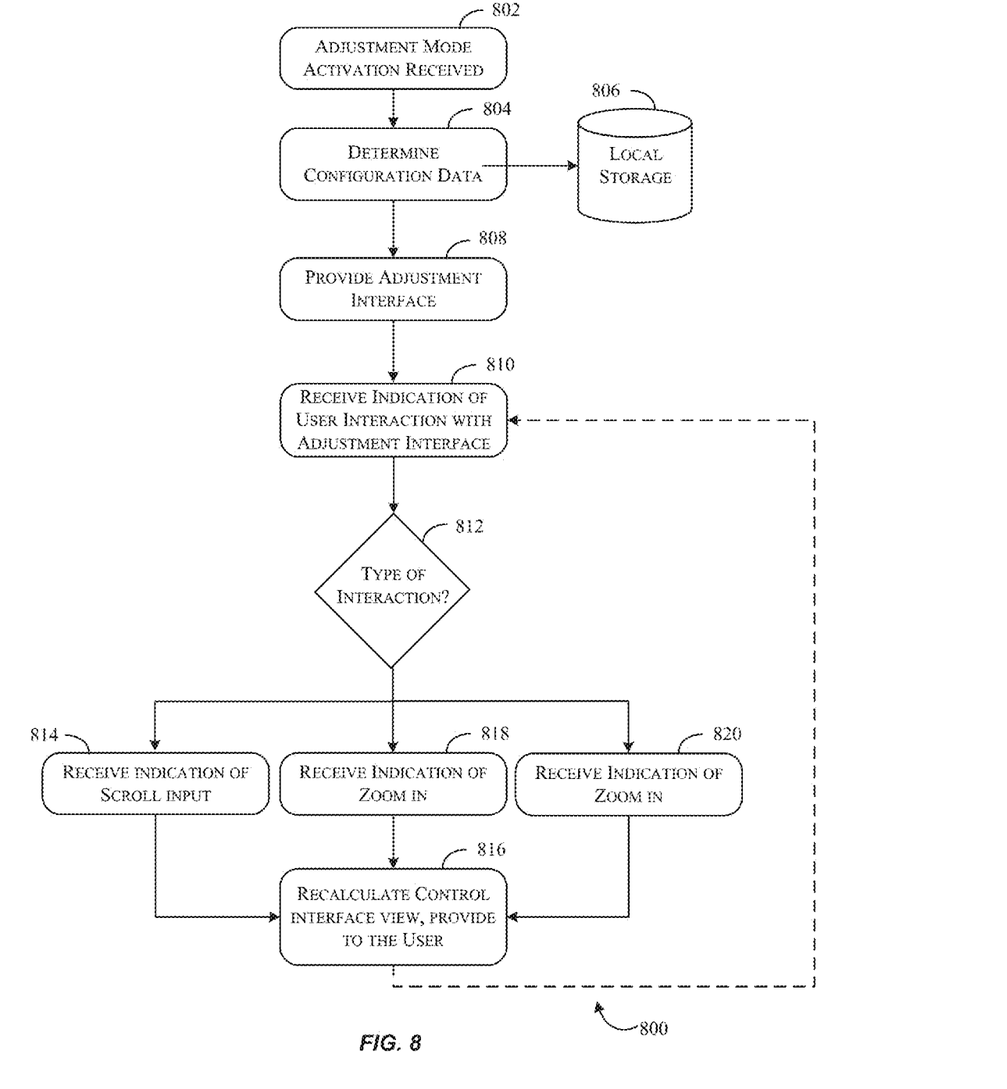
FIG. 8 is a flowchart illustrating a method for utilizing the dynamic granularity control engine, in accordance with at least one embodiment.

FIG. 8 is a flowchart illustrating a method for utilizing a dynamic granularity control engine in accordance with at least one embodiment. Flow 800 may begin at 802, where adjustment mode activation may be received. As discussed above, adjustment activation may include a selection of a check-box, a double-click/double-tap on a control interface, or any suitable manner of enable an adjustment mode selection. Configuration information may be determined at 804 by querying local storage 806 for such information. Dynamic granularity control engine (e.g., dynamic granularity control engine 702) may provide an adjustment interface at 808. Dynamic granularity control engine 702 may receive indication of user interaction with the adjustment interface at 810. The type of interaction may be determined at 812. A determination of received control scroll input at 822 may result in recalculation of the control interface view at 816 such that control interface may be scrolled to the left or right and the corresponding range may be adjusted and provided to the user. A determination of a received zoom-in indication at 818 may result in recalculation of the control interface view at 816 such that the control interface may be displayed may appear to be zoomed in and the corresponding range may be adjusted and provided to the user. A determination of the received zoom-out indication at 820 may result in recalculation of the control interface view at 820 such that the control interface may appear zoomed out and the corresponding range may be adjusted and provided to the user. Each time the user interacts with the adjustment interface, blocks 810-820 of the flow may be repeated.

Figure 9:
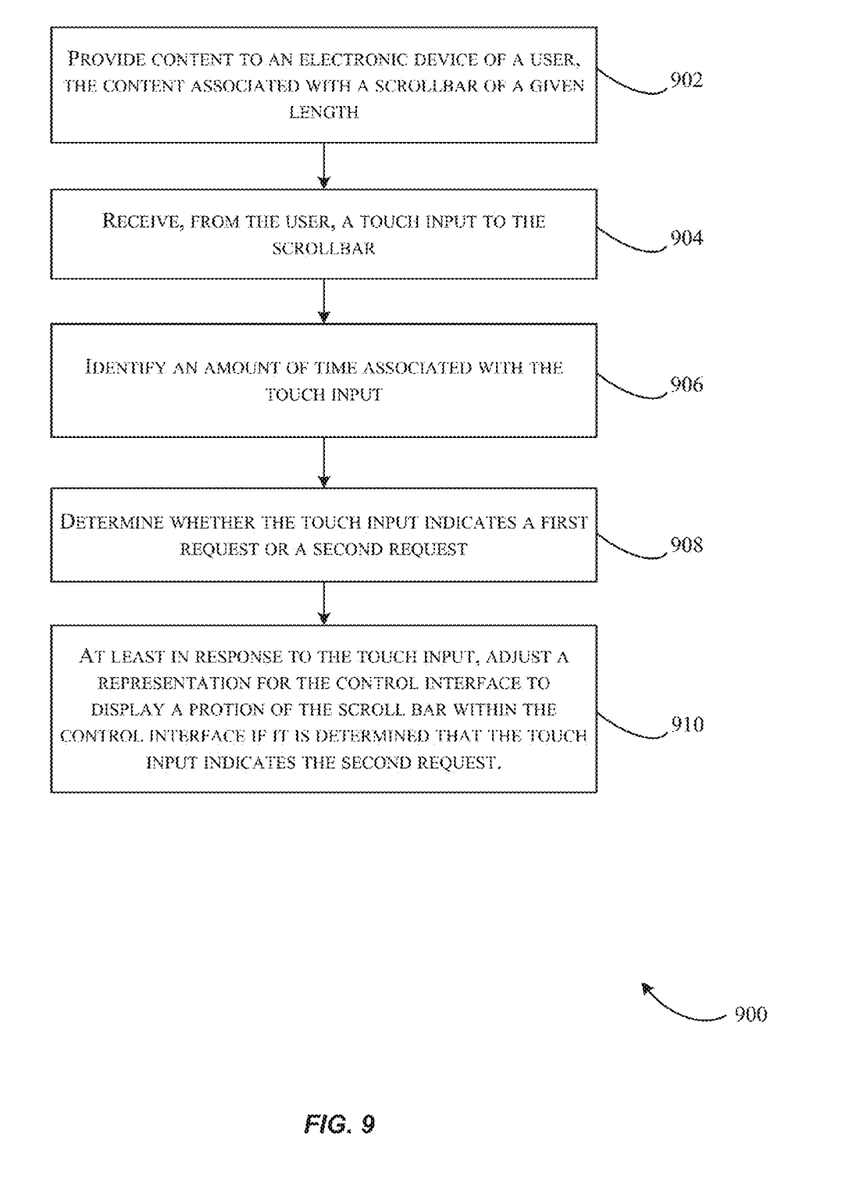
FIG. 9 is a flowchart illustrating a method for utilizing the dynamic granularity control engine, in accordance with at least one further embodiment.

FIG. 9 is a flowchart illustrating a method for utilizing a dynamic granularity control engine in accordance with at least one further embodiment. Flow 900 may begin at 902 where electronic content may be provided for display on an electronic device of a user, the electronic content being associated with a scrollbar of a given length. In at least one example, the control interface may comprise a scrollbar for adjusting volume of audio content when played on the electronic device of the user. The scrollbar may be displayed with a first range that covers the length of the scrollbar. As discussed above, the control interface may include, but not limited to, scroll bars, sliders, and navigation windows. At 904, touch input may be received from the scrollbar. At 906, an amount of time associated with the touch input may be identified. A determination as to whether the touch input indicates a first request or a second request may be determined at 908. In at least one example, the amount of time associated with the touch input may be used to determine whether the touch input indicates a first request to manipulate the content or a second request to manipulate the control interface. At 910, a representation for the control interface may be adjusted to display a portion of the scrollbar within the control interface if it is determined that the touch input indicates the second request. In at least one example, the portion of the scrollbar may be displayed with a second range that covers the given length of the control interface. The second range may be greater than the first range. In at least one example, the adjustment may occur in response to the touch input.

Figure 10:
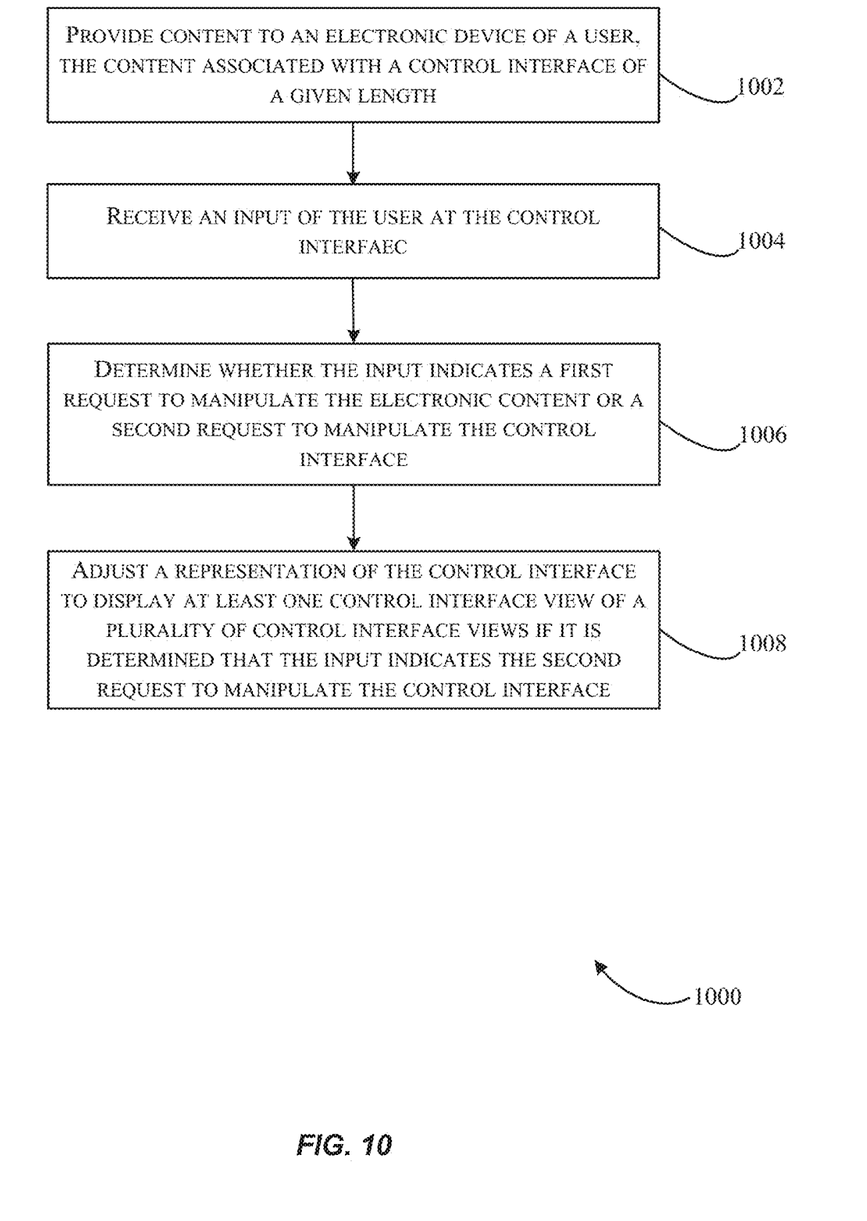
FIG. 10 is a flowchart illustrating a method for utilizing the dynamic granularity control engine, in accordance with still one further embodiment.

FIG. 10 is a flowchart illustrating a method for utilizing a dynamic granularity control engine in accordance with still one further embodiment. The flow 1000 may begin at 1002 where electronic content may be provided for display on an electronic device of a user, the electronic content being associated with a control interface of a given length. In at least one example, the control interface may comprise a scrollbar for adjusting volume of audio content when played on the electronic device of the user. The scrollbar may be displayed with a first range that covers the length of the scrollbar. As discussed above, the control interface may include, but is not limited to, a scrollbar, a slider, or a navigation window. At 1004, input may be received from the control interface. In at least one example, the input may comprise touch input. A determination as to whether the input indicates a first request to manipulate the electronic content or a second request to manipulate the control interface may be determined at 1006. At 1008, if it is determined that the input is an indication to manipulate the control interface, a representation of the control interface may be adjusted to display at least one control interface view of a plurality of control interface views. In at least one example, each of the plurality of control interface views may include different ranges of the control interface to be displayed. In some examples, adjusting the representation of the control display may be in response to receiving the input from the user.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   providing audio content to an electronic device of a user, the audio content associated with a control interface of a given length, the control interface comprising a scrollbar for adjusting volume of the audio content when played on the electronic device of the user, the scrollbar being displayed in a first view with a first range that covers the given length, the control interface covering a given area;

receiving, from the electronic device of the user, a touch input to the scrollbar;

identifying an amount of time associated with the touch input;

determining whether the touch input indicates a first request to adjust the volume of the audio content or a second request to adjust the control interface based at least in part on the amount of time associated with the touch input; and at least in response to the touch input, scaling the first view of the scrollbar to display a scaled view of the scrollbar within the control interface when it is determined that the touch input indicates the second request to adjust the control interface, the scaled view comprising a second range that covers the given length of the control interface, the scaled view covering the given area;

determining an adjustment interface for the scrollbar;

providing the adjustment interface to the electronic device;

receiving, from the electronic device, an indication of interaction with the adjustment interface; and based at least in part on the interaction, adjusting the scrollbar to display an adjusted view of the scrollbar, the adjusted view of the scrollbar having a third range, the third range being less than the first range but greater than the second range.

2. The computer-implemented method of claim 1, wherein the second range provides greater granularity than the first range with respect to the control interface.

3. The computer-implemented method of claim 1, wherein determining the adjustment interface for the scrollbar comprises determining a navigational interface for enlarging or reducing portions of the control interface, and wherein the adjusted range covers the given length of the control interface and the given area.

4. A computer-implemented method, comprising:

providing, to an electronic device of a user, electronic content associated with a control interface, the control interface capable of manipulating the electronic content when provided to the user, the control interface comprising a first view displaying a first range of the control interface, the control interface covering a given area;

receiving an input of the user at the control interface;

determining whether the input indicates a first request to manipulate the electronic content or a second request to manipulate the control interface; and scaling the first view of the control interface to display a scaled view of the control interface when it is determined that the input indicates the second request to manipulate the control interface, the scaled view being displayed to comprise a second range to be displayed within the control interface, the scaled view covering the given area;

determining an adjustment interface for the control interface;

providing the adjustment interface to the electronic device;

receiving, from the electronic device, an indication of interaction with the adjustment interface; and based at least in part on the interaction, scaling the scaled view of the control interface to display a third view of the control interface, the third view of the control interface having a third range, the third range being less than the first range but greater than the second range.

5. The computer-implemented method of claim 4, wherein the second request to manipulate the control interface is indicated by at least one of an indication that the user is hovering over the control interface for a threshold period of time, an indication that the user double-tapped the control interface, or an indication that the user selected an adjustment mode indicator.

6. The computer-implemented method of claim 4, wherein the third view covers the given area.

7. The computer-implemented method of claim 1, wherein the second range is smaller than the first range.

8. The computer-implemented method of claim 6, wherein selection of a location within the adjustment interface increases a speed at which the adjusting occurs.

9. The computer-implemented method of claim 8, wherein the speed at which the adjusting occurs is determined by the relative position of the location within the adjustment interface.

10. The computer-implemented method of claim 6, wherein the adjustment interface covers a portion of the given length of the control interface.

11. The computer-implemented method of claim 10, wherein the adjustment interface is overlaid over the control interface.

12. The computer-implemented method of claim 4, further comprising:

determining a navigational interface of the control interface;

receiving a selection of a location within the navigational interface; and adjusting display of the control interface based on the selected location within the navigational interface while maintaining granularity of the control interface.

13. A system, comprising:

a processor; and a memory storing computer-executable instructions that, when executed by the processor, cause the system to, at least:

provide, to an electronic device of a user, a control interface capable of manipulating electronic content when provided to the user, the control interface provided in a first view of a plurality of views and encompassing a first range, the control interface covering a given area;

receive an input of the user at the control interface;

determine whether the input indicates a first request to manipulate the electronic content or a second request to manipulate the control interface; and scale the first view of the control interface to display a scaled view of the plurality of views when it is determined that the input indicates the second request to manipulate the control interface, the scaled view encompassing a second range of the control interface to be displayed, the scaled view covering the given area;

determine an adjustment interface for the control interface;

provide, to the electronic device, an adjustment interface for the control interface;

receive, from the electronic device, an indication of user interaction with the adjustment interface; and based at least in part on the interaction, adjust the representation of the control interface to display a third control interface view, the third control interface view having a third display range, the third range being less than the first range but greater than the second range.

14. The system of claim 13, wherein the adjustment interface is located adjacent to the control interface.

15. The system of claim 13, storing further computer-executable instructions that, when executed by the processor, cause the system to:
receive, from the user, an additional indication of interaction with the adjustment interface, the adjustment interface being based at least in part on attributes associated with the control interface;
receive a selection of a location within the adjustment interface; and
scale the scaled view of the control interface to display a third control interface view based at least in part on the selected location, the third view covering the given area.

16. The system of claim 15, wherein attributes of the control interface include at least one of a control type, a maximum control value, a minimum control value, or a control display area.

17. A non-transitory computer-readable storage medium having stored thereon computer-executable instructions that, when executed by a processor, cause the processor to perform operations comprising:
providing, to an electronic device of a user, a control interface capable of manipulating electronic content when provided to the user, the control interface provided in a first control interface view of a plurality of control interface views and encompassing a first range, the control interface covering a given area;
receiving a first input of the user at the control interface;
manipulating the electronic content based at least in part on the first input;
receiving a second input of the user at the control interface; and
scaling the first control interface view of the control interface to display a scaled control interface view of the plurality of control interface views based at least in part on the second input, the scaled control interface view encompassing a second range of the control interface to be displayed, the scaled control interface view covering the given area;
determining an adjustment interface for the control interface;
providing the adjustment interface to the electronic device;
receiving, from the electronic device, an indication of interaction with the adjustment interface; and
based at least in part on the interaction, adjusting the control interface to be to display a third control interface view of the plurality of control interface views, the third control interview encompassing a third range of the control interface to be displayed, the third range being less than the first range but greater than the second range.

18. The non-transitory computer-readable storage medium of claim 17, wherein the second input of the user indicates selection of a location on the control interface and hovering over the control interface for a first threshold period of time.

19. The non-transitory computer-readable storage medium of claim 18, wherein causing the representation of the control interface to be adjusted to display the second control interface view of the plurality of control interface views occurs at a time after a second threshold period of time from receipt of the second input.

20. The non-transitory computer-readable storage medium of claim 19, the computer-executable instructions further causing the processor to perform operations comprising:
receiving a third input indicating the user has maintained the second input at a time after completion of the first threshold period of time; and
causing the representation of the control interface to be adjusted to display a forth control interface view of the plurality of control interface views at a time after the second threshold period of time.

21. The non-transitory computer-readable storage medium 20, the computer-executable instructions further causing the processor to perform operations comprising scaling the third control interface view of the control interface to display subsequent control interface views based on an amount of time elapsed between inputs.

* * * * *